(12) United States Patent
Miller, II et al.

(10) Patent No.: US 6,643,343 B1
(45) Date of Patent: Nov. 4, 2003

(54) TIMING RECOVERY FOR DMT-BASED DSL MODEMS

(75) Inventors: Robert Raymond Miller, II, Convent Station, NJ (US); Ranjan V. Sonalkar, North Caldwell, NJ (US); Christopher A. Stanziola, Staatsburg, NY (US)

(73) Assignee: AT&T Corp., New York, NY (US)

(*) Notice: Subject to any disclaimer, the term of this patent is extended or adjusted under 35 U.S.C. 154(b) by 479 days.

(21) Appl. No.: 09/619,866

(22) Filed: Jul. 21, 2000

(51) Int. Cl.[7] .............................. H04L 7/06; H03D 3/24
(52) U.S. Cl. ....................................... 375/364; 375/373
(58) Field of Search ................... 375/354, 344, 375/376, 371, 373, 326, 364, 367, 362, 365; 329/307; 327/141

(56) References Cited

U.S. PATENT DOCUMENTS

| | | | | |
|---|---|---|---|---|
| 4,023,115 A | * | 5/1977 | Nicolas | 331/17 |
| 5,042,052 A | * | 8/1991 | Roberts et al. | 375/344 |
| 5,079,512 A | * | 1/1992 | Muto | 329/304 |
| 5,506,836 A | * | 4/1996 | Ikeda et al. | 370/19 |
| 5,661,761 A | * | 8/1997 | Iwamatsu | 375/344 |
| 5,815,541 A | * | 9/1998 | Fukushi | 375/376 |
| 5,838,797 A | * | 11/1998 | Iwasaki | 380/49 |
| 5,940,450 A | * | 8/1999 | Koslov et al. | 375/344 |
| 6,088,402 A | * | 7/2000 | White | 375/326 |
| 6,216,107 B1 | * | 4/2001 | Rydbeck et al. | 704/500 |
| 6,363,124 B1 | * | 3/2002 | Cochran | 375/326 |
| 6,490,010 B1 | * | 12/2002 | Shibuya et al. | 348/735 |

FOREIGN PATENT DOCUMENTS

| | | | | |
|---|---|---|---|---|
| JP | 07-162470 | * | 6/1995 | H04L/27/227 |
| JP | 07-177194 | * | 7/1995 | H04L/27/38 |

* cited by examiner

Primary Examiner—Tesfaldet Bocure

(57) ABSTRACT

In an arrangement where an incoming QPSK signal contains a PRN every N frames, oscillator synchronization is achieved via control signals that are developed from the PRN frame by rotating the vectors derived from demodulated received signal, applying a complex tracking filter to the results, averaging the results, performing phase accumulation, and developing an analog voltage to be applied to a voltage controlled oscillator through D/A conversion.

7 Claims, 2 Drawing Sheets

TIMING RECOVERY FOR DMT-BASED DSL MODEMS

BACKGROUND OF THE INVENTION

This invention relates to Synchronization of oscillators, and more particularly to synchronization of oscillators of modems at customer premises equipment (CPE) to oscillators at the Local Exchange carrier (LEC) in a Discrete Multi-Tone (DMT) based digital subscriber loop (DSL).

For purposes of the digital subscriber loop, the clock at the LEC is considered to be the master clock, and the CPE modem needs to synchronize its sampling clock to that of the LEC. Modems that are based on DMT technology are governed by the T1.413 ANSI Standard, which specifies a frame that contains a Pseudo-Random Number sequence (PRN). The PRN signal frame is used during acquisition and steady state data transmission. During the acquisition period numerous PRN frames are sent back and forth between the modems at the LEC that contains the master clock and the CPE modem that contains the slave clock. These frames are used for channel estimation and for acquisition of frame synchronization. According to the Standard, after frame synchronization is established, the standard nevertheless calls for a PRN frame to be injected into the signal stream every 69 frames. Conventionally, the injected PRN frame is used to maintain frame synchronization.

To maintain clock synchronization, the ANSI Standard specifies one frequency bin in the DMT schema that is to be used as a pilot signal. This, of course, reduces the overall throughput of the system, because one frequency bin is made unavailable by the pilot signal.

SUMMARY

An advance in the art is realized by refraining from using the provided-for frequency bin for the pilot signal and, instead, using this bin for data. Oscillator synchronization is achieved via control signals that are developed from the PRN frame that arrives once every 69 frames. The control signal is developed by rotating the vectors derived from the FFT-demodulated received signal, applying a complex tracking filter to the results, averaging the results, performing phase accumulation, and developing an analog voltage to be applied to a voltage controlled oscillator through D/A conversion.

DETAILED DESCRIPTION

Figure 1:
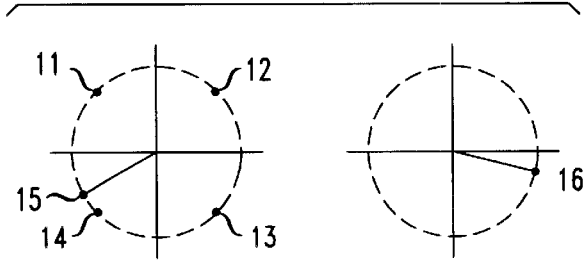
FIG. 1 shows the ideal received QPSK vectors, the variation from the ideal due to frequency mismatch, and the rotation of all vectors to zero that is performed in block 10 of FIG. 1.

FIG. 1 shows the constellation of received transmitted QPSK PRN signals 11, 12, 13, and 14. When signal 14 is transmitted and the conditions are ideal, the signal 14 would be received. However, because of noise perturbations and mismatches in the frequencies of the oscillators in the transmitting and the receiving modems, the received signal may not be signal 14, but rather, signal 15. To decode the received signal, the only decision that needs to be made with respect to the received signal is the quadrant in which the signal is found.

While the synchronization disclosed herein is applicable to various arrangements, to simplify the exposition, it is assumed that the timing source is the oscillator of the LEC modem, and the timing sink is the oscillator in the LEC modem, in which circuitry executes a timing recovery algorithm so as to synchronize its voltage-controlled crystal oscillator (VCXO) to the LEC modem's oscillator within an acceptable frequency deviation tolerance.

Generally speaking, the synchronization mechanism disclosed herein is accomplished by building an estimate of the phase difference between the CPE modem's received signal and the transmitted signal, processing the sampled differences in a second-order PLL (composed of an IIR lowpass filter and phase accumulator), and controlling the CPE's VCXO via a either a D/A converter, or a pulse-width modulator coupled with an analog lowpass filter.

The receiver's challenge is to determine what the transmitted signal was, but if the synchronization is performed during the time the transmitted signal is a known training or synchronization string, or during the time the transmitted signal employs a sparse constellation, the challenge for the receiver is minimized. In the following, a signal that carries known information or one that carries its information in a sparse constellation is termed a KS signal. A sparse constellation is a constellation that allows a receiver to detect the information embedded in the signal with an error probability of less than some selected value, for example, 5%.

Figure 2:
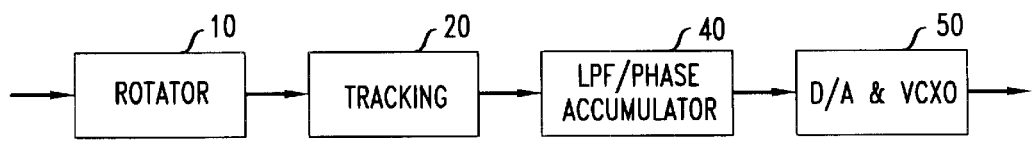
FIG. 2 presents a block diagram of processing that carried out on the received PRN sequence to yield a voltage to control a voltage controlled crystal oscillator (VCXO)

In the illustrative embodiment depicted in FIG. 2, the synchronization is carried out during the PRN sequence, which employs a four-point constellation (so, it is both known and sparse). Specifically, FIG. 2 comprises a rotator 10, a tracking module 20 responsive to the signal developed by element 10, a low-pass filter and phase accumulator 40 allowing element 20, and a D/A converter and VCXO unit 50 responsive to the signal of element 40.

Rotator block 10 develops phase difference signals between the expected signal (i.e., the ideal QPSK PRN reference) and what is actually received. Since it is known what the transmitted sequence is, each incoming complex symbol is multiplied by an phase corresponding to the appropriate pair of bits in the PRN sequence, and that yields—absent oscillator frequency mismatch and noise—a signal that has only a real value (normalized to 1, for example). Because of oscillator frequency mismatch and noise, however, the normalized signal is not strictly real but, rather, is somewhere along the unit circle at some angle other than 0. This is illustrated in FIG. 1, as mentioned above, by the received signal 15, which differs from the sent signal symbol 14 and which, when multiplied by $e^{j3\pi/4}$, yields the signal 16.

Figure 3:
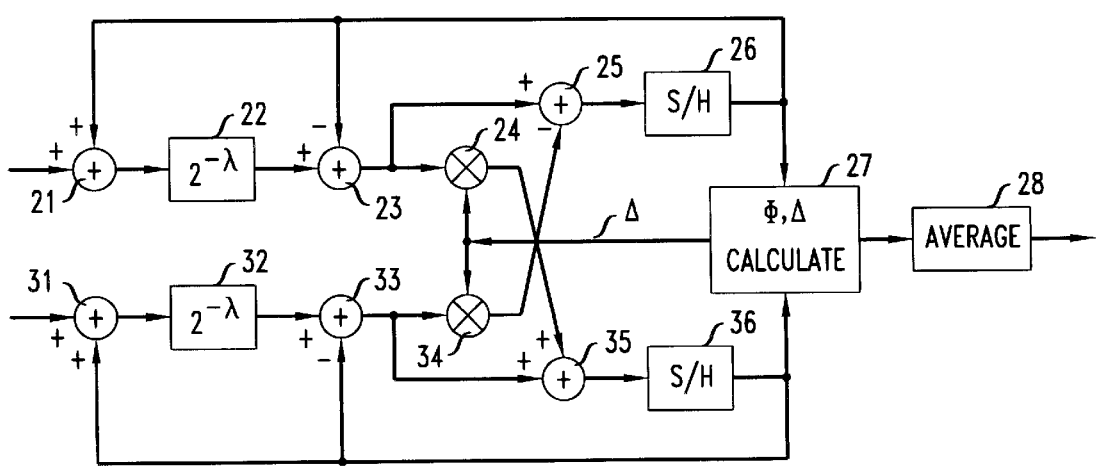
FIG. 3 shows the processing carried out in block 20 of FIG. 2.

The output of complex quadrant rotator 10 is applied to tracking filter 20, which calculates the phase of a vector related to an approximation of the integral of the "real" and the "imaginary" components of each symbol, m, outputted by rotator 10. An approximation is used to realize a fast and inexpensive embodiment. That is, a leaky integrator is employed, as depicted in FIG. 3, that is formed from elements 21, 22, 23, 25 and 26. The output of adder 23 corresponds to the output of the leaky integrator. That output, which is applied to subtractor 25, forms the current estimate of the "imaginary" component of the approximation of the integral. That estimate is sampled in sample and hold circuit 26, to yield the approximation of the integral that is used in the next time <frame.

The input to sample-and-hold circuit 26 at time frame n and complex symbol (frequency bin) m is $B_n = B_n^o - \Delta_n \cdot A_n^o$, where $B_n^o$ is the output of adder 23 in the leaky integrator, and the $\Delta_n \cdot A_n^o$ is the output of multiplier 34. The output of adder 23 is $B_n^o = B_{n-1} + 2^{-\lambda}(b_n - B_{n-1})$, where $b_n$ is the "imaginary" input of the symbol. Similarly, elements 31, 32, 33, 35, and 36 combine to form a leaky integrator, and multiplier 24 and adder 35 combine to form the signal $A_n = A_n^o - \Delta_n \cdot B_n^o$, where $A_n^o = A_{n-1} + 2^{-\lambda}(a_n - A_{n-1})$, $\Delta_n \cdot B_n^o$ is the output of multiplier 34, and $a_n$ is the "real" input of the symbol. As can be surmised from the above, the elements 22 and 32 are "multiply by $2^{-\lambda}$" circuits that can be realized through a simple right-shift register operation. When the $b_n$ and the $a_n$ signals are expressed in 16 bits, the value of $\lambda$ is typically between 8 and 16, and the arithmetic following circuits 22 and 32 are carried out with 32-bit precision.

The frequency of the sampling clock in elements 26 and 36 is approximately 4312 Hz during the acquisition phase (i.e., when the modem communication is first initiated), and is approximately 471 Hz otherwise (i.e., during the tracking phase).

The $B_{n-1}$ output of element 26 and the $A_{n-1}$ output of element 36 are applied to block 27 where the step size and an angle of the phasor represented by $B_{n-1}$ and $A_{n-1}$ are computed. The step size, $\Delta$, is computed in accordance with the equation $\Delta_n = K \sin(\Phi_n) \approx K B_{n-1}$, where, illustratively, $K = 2^{-4}$. Other values of K can also be employed. The angle of the phasor generated by circuit 20 is expected to be small, so an approximation of the angle is computed by the quotient of the two input signals; that is, $$\Phi_n = \tan^{-1}(B_{n-1}/A_{n-1}) \approx (B_{n-1}/A_{n-1}).$$

This, of course, is evaluated for each value of m. The result is averaged in block 28 in accordance with the following equation:

$$\Phi_n = \frac{1}{M} \sum_{m=1}^{M} \frac{(\Phi_n)_m}{m}.$$

Figure 4:
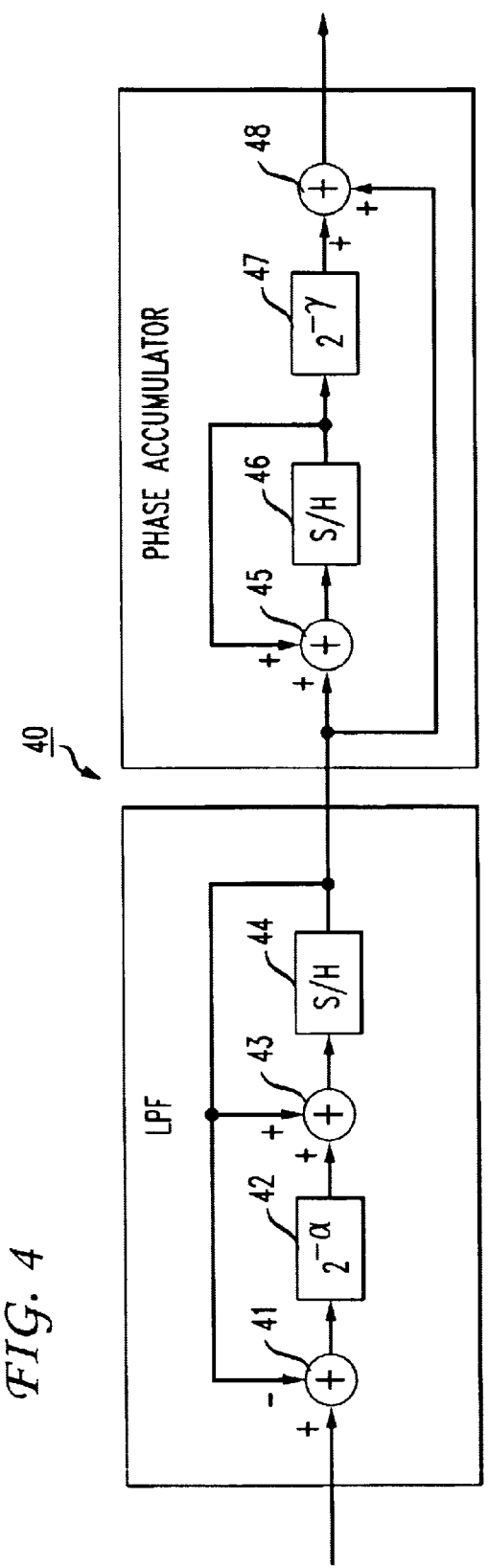
FIG. 4 shows the processing carried out in block 40 of FIG. 2.

The output of block 20 is applied to low pass filter/phase accumulator block 40, the details of which are shown in FIG. 4. Elements 41–44 form the low pass filter, realizing the difference equation $$\Phi_n = \Phi_{n-1} + 2^{-\alpha}(\Phi_n - \Phi_{n-1})$$

at the output of adder 43. The value of a is typically in the range of 4 to 6. Elements 45–48 form the phase accumulator, realizing the difference equation $$\Phi_n + 2^{-\gamma} c_{n-1}$$

at the output of adder 48, which is also the output of the phase accumulator, where $$c_{n-1} = c_n - \Phi_n.$$

The value of y is typically in the range of 10 to 14.

Figure 5:
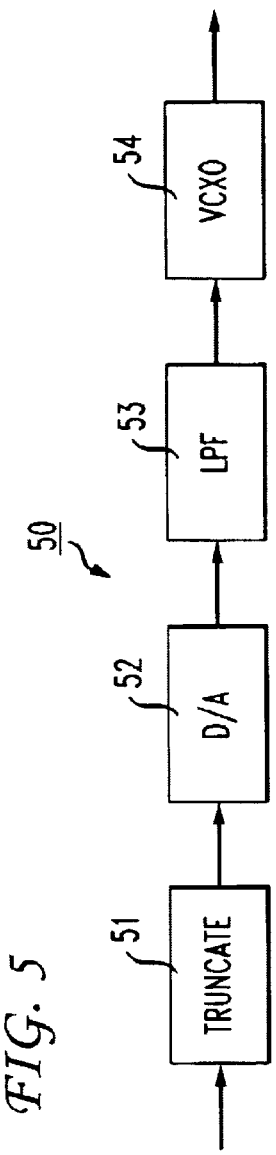
FIG. 5 shows a block diagram of elements included within block 50 of FIG. 2.

The output of the phase accumulator is applied to block 50, a block diagram of which is shown in FIG. 5. Circuit 51 in FIG. 5 simply discards a number of least significant bits. The incoming signals are 32-bit words in 2's complement format. Circuit 51 truncates the signals to 14-bit, 2's complement words and applies the resulting signal to DIA converter 52. Circuit 52 can be any conventional D/A circuit. A fairly inexpensive construction that can be employed converts the number to sign-magnitude format, places the magnitude portion in a down counter, counts the counter down to zero, and concurrently generates a positive or a negative pulse, based on the sign, for as long as the counter is greater than 0. The result is a pulse having a width that is directly proportional to the incoming signal's magnitude (14 bit resolution), and a sign that corresponds to the incoming signal's sign. The output signal of DIA converter 52 is applied to conventional low pass filter 53, and the output signal of filter 53 is applied to the frequency control port of VCXO 54.

The above discloses the principles of this invention by way of a specific embodiment. It should be realized, however, that persons skilled in the art might make various modification and additions thereto without departing from the spirit and scope of this invention. For example, the above describes a proportional computation of that step size. It is also possible to employ other relationships for computing the step size, such as a logarithmic proportional-integral control, where $$\Delta_n = sgn(B_{n-1}) \left[ \frac{1}{2^{(K-\log 2(Pctr))}} \right]^2,$$

where K is a constant that equals 12 during acquisition and 10 during tracking, and Pctr is the value of a 10 bit PRN symbol counter that is incremented at each DMT PRN symbol time, and each time there is a sign change in $B_{n-1}$ the Pctr counter is reset.

What is claimed is:

1. A method for controlling a frequency of a voltage controlled oscillator, responsive to a received input signal that contains frames where, in at least some of said frames the input signal that contains frames where, in at least some of said frames, the input signal is a KS signal, at least in part carrying known information, carrying information in a spare constellation, or both, comprising the steps of:

identifying received information signals contained in said KS signal in said at least some of said frames of said received input signal;

determining sent symbols that resulted in said received information signals;

rotating said received information signals in accordance with said sent symbols to form rotated signals;

developing phase difference signals from said rotated signals;

accumulating said phase difference signals to form an accumulated phase difference signal; and converting said accumulated phase difference signal to an analog form for application to said voltage controlled oscillator, where said step of developing phase difference signals computes a signal $\Phi_n$ through the equation $\Phi_n = \tan^{-1}(B_{n-1}/A_{n-1})$, or through an approximation equation $\Phi_n \approx (B_{n-1}/A_{n-1})$, where $B_n = B_n^o - \Delta_n \cdot A_n^o$ $B_n^o = B_{n-1} + 2^{-\lambda}(b_n - B_{n-1})$, $A_n = A_n^o - \Delta_n \cdot B_n^o$, $A_n^o = A_{n-1} + 2^{-\lambda}(a_n - A_{n-1})$, where
- $B_n$ is an input at time frame n,
- $B_{n-1}$ is an input at time frame n-1,
- $B_n^o$ is an output at time frame n,
- $A_n$ is an input at time frame n,
- $A_{n-1}$ is an input at time frame n-1,
- $A_n^o$ is an output at time frame n,
- M is a number of identified information signals
- $b_n$ is a component of an identified received information signal, there being M such identified information signals,
- $a_n$ is a second component of said identified received information signal there being M such identified information signals,
- $\lambda$ is a selected constant and
- $\Delta_n$ a step size that is a function of $B_{n-1}$.

2. The method of claim 1 where $8 \leq \lambda \leq 16$ when $b_n$ and $a_n$ are expressed in 16 bits.

3. The method of claim 1 where $\Delta_n = K \sin(\Phi_n)$, where K is a selected constant.

4. The method of claim 1 where $\Delta_n \approx K \sin(\Phi_n)$, where K is a selected constant.

5. The method of claim 1 where $$\Delta_n = sgn(B_{n-1})\left[\frac{1}{2^{(K-\log 2(Pctr))}}\right]^2,$$

where Pctr is the value of a counter that is incremented with each determined sent symbol, and rest each time $B_{n-1}$ changes sign and where K is a selected constant.

6. The method of claim 1 where said step of developing phase difference signals further computes the signal $$\Phi_n = \frac{1}{M}\sum_{m=1}^{M}\frac{(\Phi_n)_m}{m}.$$

7. Apparatus comprising:
- a rotator responsive to a received input signal;
- a tracking circuit responsive to said rotator that computes phase difference between received symbols contained in said received input signal and sent symbols;
- a low pass filter and phase accumulator to said tracking circuit; and
- a D/A converter followed by a low pass filter,
- where said rotator circuit develops signals $a_n$ and $b_n$ which are real and imaginary components of successive symbols in a frequency bin m, there being M such frequency bins, and said tracking circuit develops the signal $$\Phi_n = \frac{1}{M}\sum_{m=1}^{M}\frac{(\Phi_n)_m}{m},$$

where $\Phi_n = \tan^{-1}(B_{n-1}/A_{n-1})$, or $\Phi_n \approx (B_{n-1}/A_{n-1})$, $B_n = B_n^o - \Delta_n \cdot A_n^o$, $B_n^o = B_{n-1} + 2^{-\lambda}(b_n - B_{n-1})$, $A_n = A_n^o - \Delta_n \cdot B_n^o$, $A_n^o = A_{n-1} + 2^{-\lambda}(a_n - A_{n-1})$, where
- $B_n$ is an output at time frame n,
- $B_{n-1}$ is an output at time frame n-1,
- $B_n^o$ is an output at time frame n,
- $A_n$ is an input at time frame n,
- $A_{n-1}$ is an output at time frame n-1,
- $A_n^o$ is an output at time frame n,
- M is a number of identified information signals,
- $b_n$ is a component of an identified received information signal, there being M such identified information signals,
- $a_n$ is a second component of said identified received information signal, there being M such identified information signals,
- $\lambda$ is a selected constant, and
- $\Delta_n$ a step size that is a function of $B_{n-1}$.

* * * * *